UNITED STATES PATENT OFFICE.

HERRMANN GUSTAV LEITHÄUSER, OF SCHMÖLLN, GERMANY, ASSIGNOR TO EDUARD JULIUS CONN, OF HAMBURG, GERMANY.

METHOD OF PRODUCING BUTTONS FROM AUSTRALIAN IVORY-NUTS.

No. 829,720.     Specification of Letters Patent.     Patented Aug. 28, 1906.

Application filed April 2, 1906. Serial No. 309,566.

*To all whom it may concern:*

Be it known that I, HERRMANN GUSTAV LEITHÄUSER, a subject of the Duke of Saxe-Altenburg, and a resident of Schmölln, in the Duchy of Saxe-Altenburg, Germany, have invented a certain new and useful Improved Method of Producing Buttons from Australian Ivory-Nuts, of which the following is a specification.

This invention relates to the production of buttons from Australian ivory-nuts, such as Tahiti or Fiji nuts, from certain sago-trees (*Sagus amicarum*) of the Solomon, Friendly, Fiji, and Caroline Islands, and has for its object to do away with drawbacks heretofore experienced in the manufacture of buttons therefrom.

The usual way of making buttons—*i. e.*, cutting the nuts into disks and turning or sawing the same to shape—could not be made use of in making small buttons of disk shape, for the reason that the buttons would not retain their shape, but became twisted or bent, or they would otherwise shrink out of shape. To avoid this, it has been proposed to cut out cylindrical bodies from the nuts and to make buttons therefrom; but this is a very roundabout and tedious way and has the further disadvantage of giving a great amount of waste.

According to the present invention the said nuts are so treated and worked upon that durable unchangeable round buttons of even very small thickness can be produced.

The nuts are sawed into disks corresponding to the thickness of the button-disks to be produced—say about five to six millimeters. These disks are boiled in substances capable of extracting fat or grease—for instance, in solutions of soda. When the superfluous fatty matters are expelled from the nut-disks, they are dried in hot air. The result of such treatment is that the outer cells, which are considerably larger than the inner cells, shrink to substantially the same size as the inner cells of the nut, so that a transverse slice of such nut after treatment will be substantially of the same density throughout and any alteration in form after the button is made will be uniform throughout.

I believe that I am the first to treat nuts of the *Sagus amicarum* to render their internal structure substantially uniform, and thus permit slices across the nut to be used throughout their extent for making buttons, which by reason of their uniform structure will not warp.

From the disks when sufficiently freed from fat and dried, and thereby having attained a uniform structure, buttons can be cut by means of two circular cutters rotating in opposite directions to each other, whereby both faces obtain the desired shape corresponding to the shape of the cutters.

The finishing of the buttons (perforating, polishing, bleaching, coloring, &c.) can be carried out in any known manner, preferably as follows:

When the buttons are bored or perforated and sifted, they are smoothed or ground in rotating drums (rattling-mills) by means of finely-pulverized pumice-stone and then highly polished by the usual polishing means, (chalk and tripoli mixed with oil.)

I claim—

In the method of making buttons from Australian nuts, cutting the nuts into slices or disks and extracting fatty matters therefrom and rendering their structure substantially uniform throughout.

HERRMANN GUSTAV LEITHÄUSER.

Witnesses:
   M. NAUMANN,
   CHARLES NEUER.